United States Patent [19]

Hiltner et al.

[11] Patent Number: 5,119,368
[45] Date of Patent: Jun. 2, 1992

[54] HIGH-SPEED TIME-DIVISION SWITCHING SYSTEM

[75] Inventors: Jeffrey A. Hiltner, Winfield; Robert L. Pawelski, Lisle, both of Ill.

[73] Assignee: AT&T Bell Laboratories, Murray Hill, N.J.

[21] Appl. No.: 507,430

[22] Filed: Apr. 10, 1990

[51] Int. Cl.⁵ .............................................. H04J 3/02
[52] U.S. Cl. .................................... 370/58.1; 370/68; 370/112
[58] Field of Search ....................... 370/58.1, 60, 94.1, 370/112, 85.7, 95.1, 68

[56] References Cited

U.S. PATENT DOCUMENTS

| | | | |
|---|---|---|---|
| 3,632,883 | 1/1972 | Aagaard | 179/15 AQ |
| 3,678,205 | 7/1972 | cohen et al. | 179/15 AQ |
| 3,824,349 | 7/1974 | Buchner | 179/15 BS |
| 4,049,917 | 9/1977 | Copperi et al. | 370/112 |
| 4,345,273 | 8/1982 | Barabas et al. | 358/86 |
| 4,397,016 | 8/1983 | Broussaud | 370/4 |
| 4,566,007 | 1/1986 | Richards | 340/825.8 |
| 4,577,308 | 3/1986 | Larson et al. | 370/9 |
| 4,734,907 | 3/1988 | Turner | 370/60 |
| 4,813,038 | 3/1989 | Lee | 370/60 |
| 4,817,083 | 3/1989 | Richards | 370/59 |
| 4,887,079 | 12/1989 | Hwang et al. | 340/825.8 |
| 4,901,309 | 2/1990 | Turner | 370/60 |
| 4,977,558 | 12/1990 | Iguchi et al. | 370/112 |
| 5,001,702 | 3/1991 | Teraslinna et al. | 370/60 |

FOREIGN PATENT DOCUMENTS 0028416 11/1980 European Pat. Off. .
0101057 8/1983 European Pat. Off. .
2225898 11/1974 France .

OTHER PUBLICATIONS

T. Matsunaga et al. "Experimental Application of LD Switch Modules to 256 Mbit/s Optical Time Switching", *Electronics Letters*, vol. 21, No. 20, Sep. 26, 1985, pp. 945–946.

*Primary Examiner*—Douglas W. Olms
*Assistant Examiner*—Min Jung
*Attorney, Agent, or Firm*—David Volejnicek

[57] ABSTRACT

A non-blocking broadband broadcast time-division switching system (10) comprises a time-slot replication stage (12) followed by a conventional TMS stage (11). The replication stage replaces the TSI stage of conventional switching systems. Time division multiplexed links (16) are connected to inputs of the system. Each input link is connected to the input of a different replicator (14). Each replicator has as many outputs as there are time slots (202) in a frame (201) on an input link. Replicators' outputs are connected each to a different input of the TMS stage. In one embodiment, a replicator generates each time slot of a received frame at a different output and replicates the individual time slot at the individual output during each time-slot interval of a frame interval. In another embodiment, a replicator generates each time slot of a received frame at a different time at each output, thus generating a delayed replica of the received frame at the outputs. In either embodiment, during each time-slot interval, each replicator transmits a frame of different received time slots to the TMS stage.

19 Claims, 8 Drawing Sheets

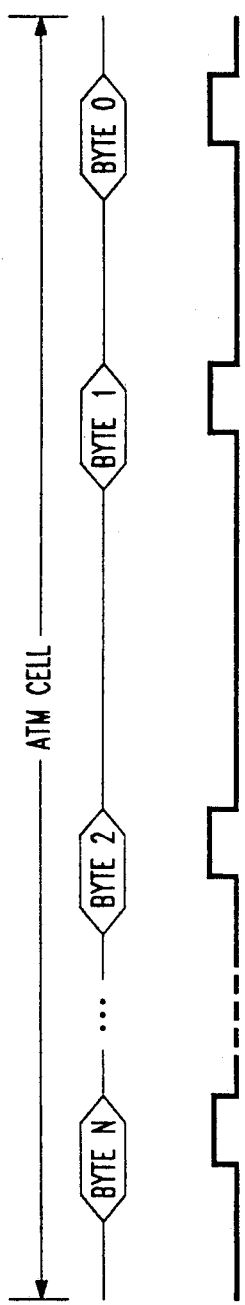
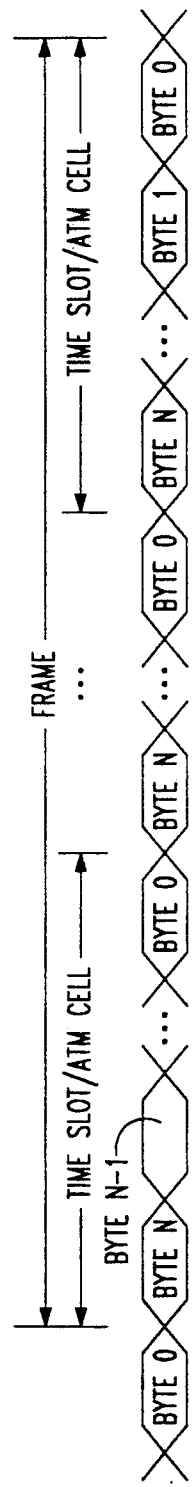
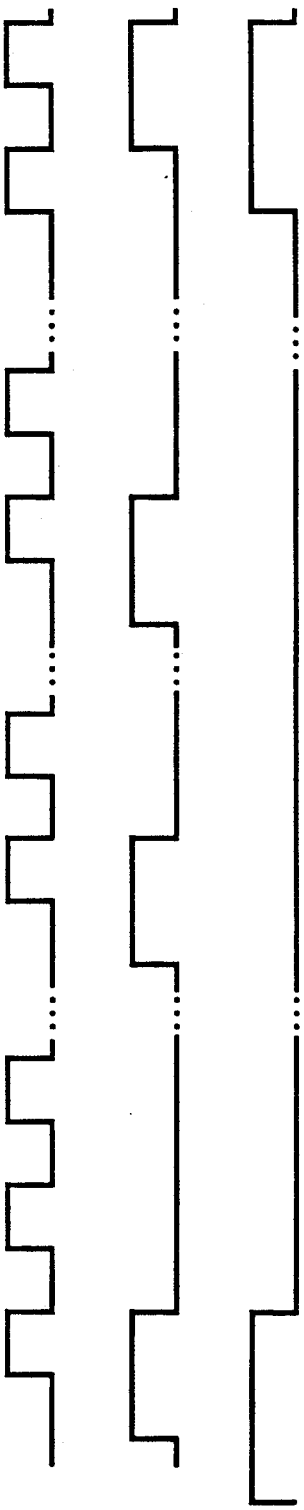
FIG. 5A LINK 16
FIG. 5B IBYTE CLK
FIG. 5C IBYTE-0 CLK
FIG. 5D LINK 17
FIG. 5E OBIT CLK
FIG. 5F OBYTE CLK
FIG. 5G OBYTE-0 CLK
FIG. 5H OFRAME CLK

5,119,368

HIGH-SPEED TIME-DIVISION SWITCHING SYSTEM

TECHNICAL FIELD

This invention relates to telecommunication switching systems, and particularly relates to time-division switching systems.

BACKGROUND OF THE INVENTION

Broadband telecommunications, such as broadband ISDN and motion video (e.g., television broadcast) communications, operate at very high transmission rates, typically at tens or hundreds of megahertz. To switch such telecommunications, switching systems are required that are capable of operating at corresponding or higher rates. Conventionally, bandwidth-division switching systems such as space-division and wavelength-division switching systems have been used for this purpose. However, conspicuously absent has been the use of time-division switching systems for such applications. The reason is that time-division multiplexing increases the rate at which the switch must operate, by a multiple of an individual switched communication's transmission rate. Hence, time-division switching systems operating at hundreds of megahertz or even gigahertz are required to switch broadband telecommunications.

Recently, time-division switching systems capable of operating at these very high rates have become feasible. In their simplest form, such switching systems consist of a time-multiplexed switch (TMS) stage that has incoming time-division multiplexed (TDM) telecommunication links coupled thereto through a time-slot interchange (TSI) stage. Unfortunately, time-slot interchangers capable of operating at hundred-megahertz or gigahertz rates are very expensive, to the extent that the cost of the TSI stage dwarfs the cost of the TMS stage and makes the whole switching system prohibitively expensive. Hence, while time-division switching systems capable of handling broadband telecommunications have become technically feasible, they have yet to become commercially practical.

SUMMARY OF THE INVENTION

This invention is directed to resolving this and other disadvantages of the prior art. According to the invention, TSI stage of a time-division switching system is eliminated and is replaced by a time-slot replication stage. The system retains a time-multiplexed switching (TMS) stage having a plurality of inputs and at least one output port. During each time-slot interval, the TMS stage transmits at any output port a time slot of information received by it at any input; i.e., the switch operates at the time-slot transmission rate or a higher rate. The time-slot replication stage that replaces the TSI stage includes a plurality of replicators. Each has an input port for receiving frames of time slots of information, and a plurality of outputs each connected to a different input of the TMS stage. Each replicator transmits a frame of time slots of received information to the inputs of the TMS stage during each TMS time-slot interval. In one embodiment, each replicator receives each time slot of information at its input port during a different time-slot interval, and transmits each individual time slot of a received frame at a different one output during each time-slot interval of a TMS frame interval. In another embodiment, each replicator receives each time slot of information at its input port during a different time-slot interval, and transmits each time slot of a received frame at each output during different time-slot intervals of a TMS frame interval. An individual received time slot is thus made available to the TMS stage during each time-slot interval of a TMS frame interval: in this respect, the replication stage performs the same service for the switching system as is traditionally performed by the TSI stage, albeit in a different manner. But the replicators are typically much simpler and cheaper to implement than high-speed TSIs. For example, in one embodiment described herein, the replicator is made of a demultiplexer and buffers that repeatedly transmit each demultiplexed time slot of a frame at different outputs. And in another embodiment described herein, the replicator is made of a serial input-parallel output shift register, or a delay line with a sequence of output taps. Consequently, the total cost of a high-speed time division switching system is significantly reduced, making the switching system commercially practical.

The switching system as characterized above is particularly suited for implementation and use as a nonblocking broadcast or multicast switching system for motion video distribution.

These and other advantages and features of the present invention will become apparent from the following descriptions of illustrative embodiments of the invention taken together with the drawing.

BRIEF DESCRIPTION OF THE DRAWING

FIGS. 5A-5H are timing diagrams of the clock signals of the replicator of FIG. 4;

DETAILED DESCRIPTION

Figure 1:
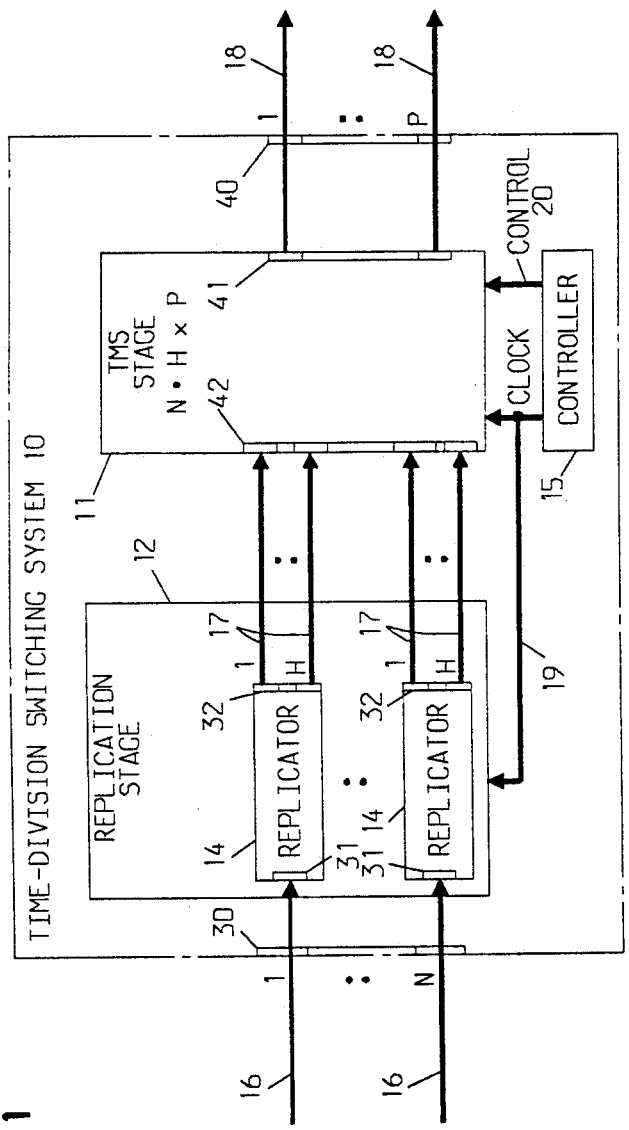
FIG. 1 is a block diagram of an illustrative switching system that includes an embodiment of the invention.

FIG. 1 shows an illustrative time-division switching system 10. Connected to input ports 30 of system 10 are a plurality (N) of time-division multiplexed input links 16. Connected to output ports 40 of system 10 are a plurality (P) of time-division multiplexed output links 18.

Figure 2:
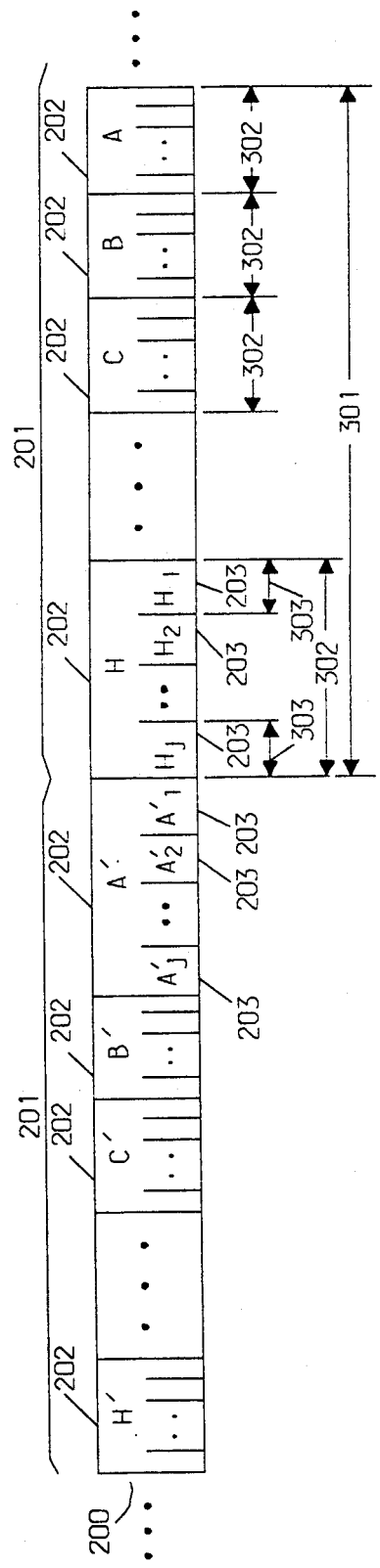
FIG. 2 is a high-level block diagram of the transmission format of links connected to the system of FIG. 1.

Turning to FIG. 2, each link 18, and commonly also each link 16, carries a sequence 200 of frames 201, each comprising a predetermined number of time slots 202. Each time slot 202 carries information, such as data. Each time slot 202 may comprise a single data bit 203. Alternatively, each time slot 202 comprises a plurality of bits 203, such as a data byte or one or more asynchronous transfer mode (ATM) cells. For purposes of this application, all frames 201 carry identical numbers of time slots 202, and all time slots 202 carry identical numbers of bits 203. Links 16 and 18 may be subrate multiplexed; that is, each time slot 202 of a frame 201 corresponds with a particular communication channel and sequentially-identical time slots 202 from adjacent frames 201 typically correspond to the same one communication channel, and consequently the corresponding communication channel and destination of an individual time slot 203 is determined from the position of the individual time slot 202 in the sequence of time slots 202 within a frame 201. Alternatively, links 16 and 18 may be statistically multiplexed; that is, time slots 202 of each frame 201 are assigned to particular communication channels on an as-needed basis, so that sequentially-identical time slots 202 from adjacent frames 201 typically correspond to different communication channels, and consequently the corresponding communications channel and destination of an individual time slot 202 is determined from information carried within the individual time slot 202 itself. (Clearly, in the statistically multiplexed arrangement, each time slot 202 by necessity must carry a plurality of bits 203.)

Transmissions on links 18 occur at a predetermined transmission rate, e.g., 150 Mbps or 1.2 Gbps. This is also commonly true of links 16, though not necessarily. For example, transmissions on links 16 may be at a different rate, with system 10 effecting a rate change between links 16 and 18, or links 16 may be asynchronous links. Consequently, data entity durations are defined from the standpoint of links 18. Each frame 201, time slot 202, and bit 203 has a time interval of duration associated therewith. For a bit 203, a bit interval 303 is defined as (1/X), where X is the transmission rate. For a time slot 202, a time-slot interval 302 is defined as (J times bit interval 303), where J is the number of bits 203 in a time slot 202. And for a frame 201, a frame interval 301 is defined as (H times time-slot interval 302), where H is the number of time slots 202 in a frame 201. Switching system 10 operates at or above the transmission rate; in this illustrative example, it is assumed to operate at the same rate. That is, replication stage 12 transmits bits 203 on each line 17 at the rate X, and TMS stage 11 switches bits 203 from lines 17 to each of its individual output ports 41 at the rate X.

Returning to consider FIG. 1, system 10 comprises two switch stages: a replication stage 12 which takes the place of a conventional TSI stage, followed by a conventional TMS stage 11. Input links 16 are connected to input ports 31 of replication stage 12. Stage 12 includes N individual replicators 14, one for each link 16. A link 16 connects to input port 31 of its corresponding replicator 14. Each replicator 14 has H outputs 32, one per each time slot 202 of a frame 201 on link 16. Each output 32 is connected by a separate lead 17 to an input 42 of TMS stage 11.

TMS stage 11 has N·H inputs 42, one for each lead 17 from demultiplexer stage 12. This is H times as many inputs 42 as would be required if stage 12 were a TSI stage; however, this increase is not generally significant either from a technological or a commercial standpoint, as it is now well known in the art how to construct large TMS switching fabrics inexpensively. An illustrative example of such a TMS fabric suitable for implementation of TMS stage 11 is the so-called Richards network, described illustratively in U.S. Pat. Nos. 4,566,007, 4,817,083, and 4,887,079. TMS stage 11 has P output ports 41, each for connection to a different outgoing link 18. No relation need exist between the number N·H of inputs 42 and the number P of output ports 41 of stage 11; the TMS switching fabric may be completely asymmetrical.

Operation of TMS stage 11 is controlled by a conventional controller 15. Controller 15 provides conventional control signals to stage 11 via control bus 20, and provides system 10 with timing signals—illustratively, bit, byte, time slot, and frame clock signals—via a clock bus 19. The timing signals are also distributed by bus 19 to replication stage 12. Unlike a TSI stage, which requires its own externally-programmable control complex, the timing signals from clock bus 19 are the only control input that is needed by replication stage 12 in the simple case. Replicators 14 use the timing signals to synchronize their operation with the operation of TMS stage 11.

Figure 3:
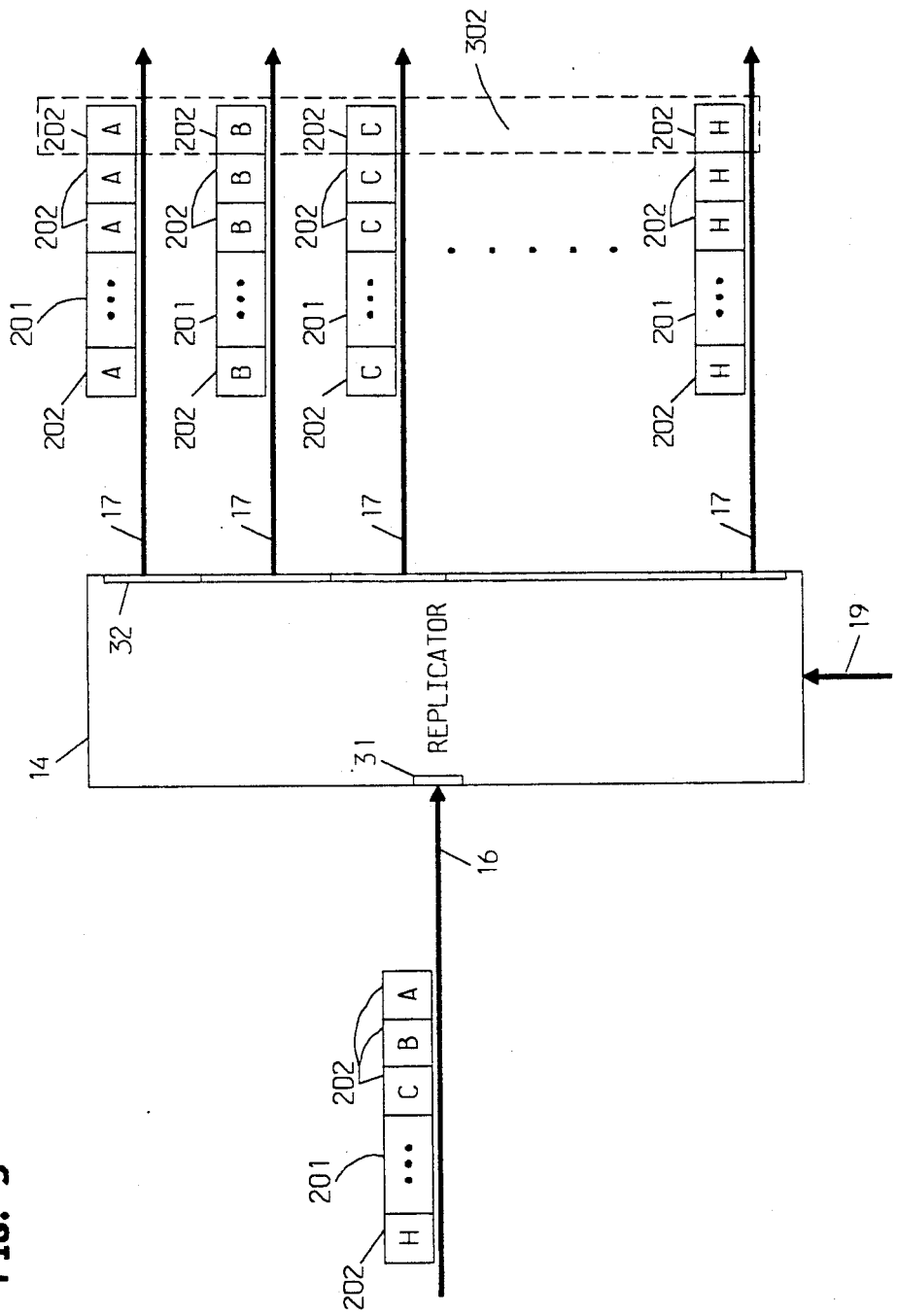
FIG. 3 is a block diagram of a first illustrative embodiment of a replicator of the system of FIG. 1.

Turning to FIG. 3, it shows a first illustrative embodiment of the functionality of a replicator 14. For each frame 201 received at its input ports 31, replicator 14 outputs each time slot 202 of the received frame 201 at a different output 32, and replicates that time slot 202 (that is, replicates the information, the bits, included in that time slot) during each time-slot interval 302 of a TMS frame interval 301. Illustratively, as shown in FIG. 3, replicator 14 receives a frame 201 of H time slots 202, designated A through H, and in response generates at a first output 32 a frame 201 of H time slots 202 each containing a replica of received time slot A, generates at a second output 32 a frame 201 of H time slots 202 each containing a replica of received time slot B, generates at a third output 32 a frame 201 of H time slots 202 each containing a replica of received time slot C, and so on, for each time slot A through H. Consequently, each time slot 202 of a received frame 201 is made available to TMS stage 11 during every time-slot interval 302 of a TMS frame interval 301.

Figure 4:
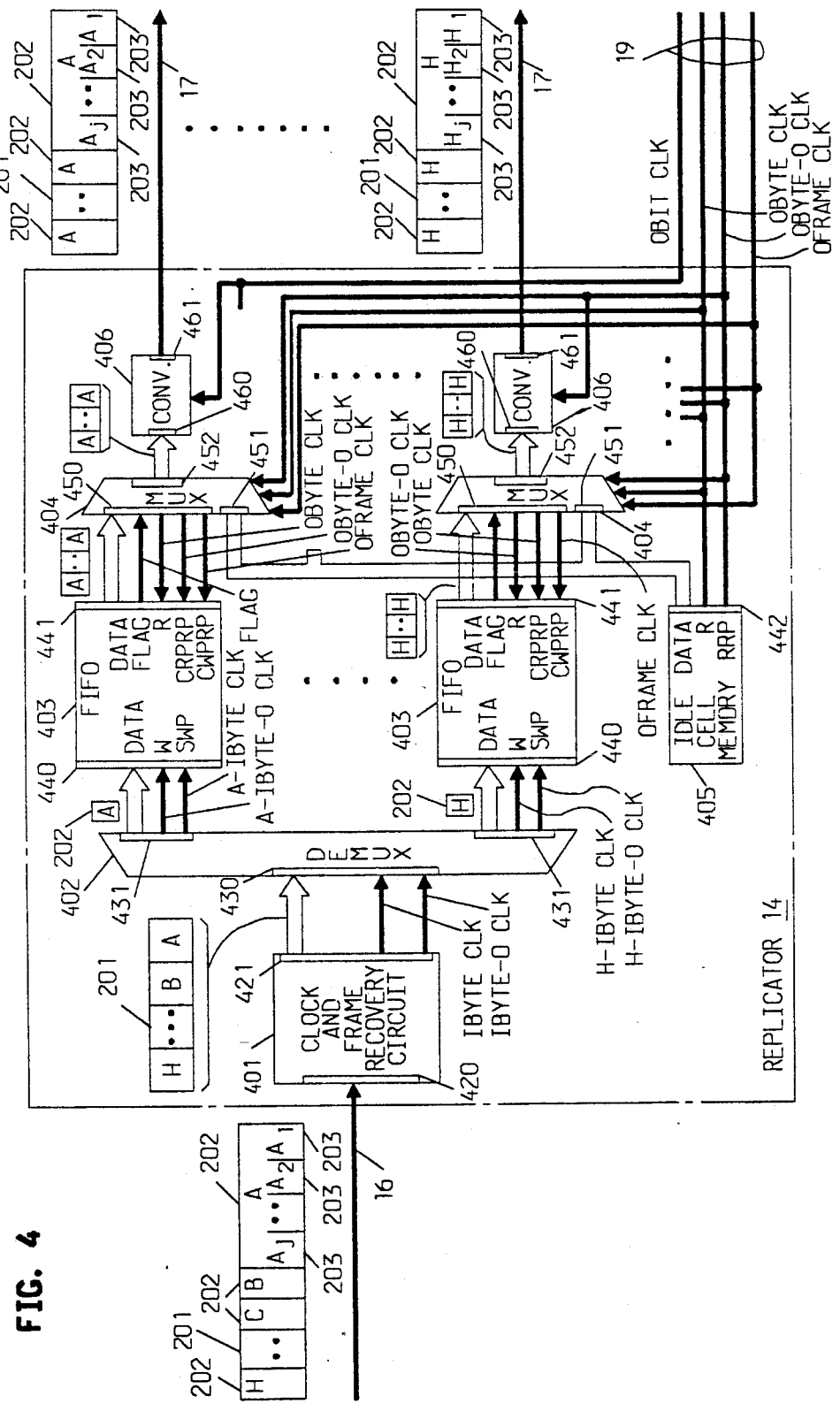
FIG. 4 is a block diagram of an implementation of the replicator of FIG. 3.

FIG. 4 shows an illustrative implementation of replicator 14 of FIG. 3. This implementation is especially useful in conjunction with links 16 wherein each time slot 202 carries a predetermined number——one or more—of Asynchronous Transfer Mode (ATM) cells, e.g., links 16 that follow the Synchronous Optical Network (SONET) protocol. Each ATM cell presently consists of 53, 8-bit bytes of information. Each cell carries a virtual cell identifier (VCI) that identifies the cell's destination. Any one frame 201 may include zero or more cells having the same VCI, and may include a random assortment and ordering of cells having the same or different VCIs. One or more time slots may carry idle or other SONET control ATM cells.

The implementation shown in FIG. 4 is a particularly apt illustration of the invention, because implementations of replicator 14 of FIG. 3 for handling simpler protocols (e.g., ones having single-bit or single-byte time slots or ones making use of subrate multiplexing) are typically merely degenerative, i.e., simplified, versions of the implementation shown in FIG. 4.

Link 16 is connected to input 420 of a clock and frame recovery circuit 401. Circuit 401 receives a bit-serial stream of frames 201 from link 16 and recovers therefrom a bit clock, a byte clock (IBYTE CLK), and a start-of-cell clock (IBYTE-0 CLK). If frames 201 were subrate-multiplexed, a start-of-frame clock and a start-of-time-slot clock would also be recovered. However, since frames 201 are statistically multiplexed in this example, and each ATM cell carries its own destination information (VCI), the additional clocks are not needed. Circuit 401 uses the recovered bit clock and byte clock to convert the received bit-serial data stream into a byte-serial (i.e., 8-bit parallel) signal stream. Of course, if link 16 were a byte-serial transmission medium, e.g., a data bus, this conversion would not be needed. Clock and frame recovery circuits are well known in the art.

Circuit 401 transmits the byte-serial data stream and the recovered byte and start-of-cell signals from its output port 421 to input port 430 of a demultiplexer 402. Demultiplexer 402 has a plurality of output ports 431; as many as there are time slots 202 in a frame 201. Each output port 431 of demultiplexer 402 corresponds to a different communication channel (i.e., a different VCI). Demultiplexer 402 determines from the VCI carried by each individual ATM cell which channel it corresponds to, and transmits the cell at the corresponding output port 431; demultiplexer 402 throws away ATM cells with VCIs other than the H unique VCIs that it is expecting (for example, ATM idle cells). Demultiplexer 402 is illustratively implemented like a node of a self-routing packet network. The implementation of such nodes is well known in the art.

If frames 201 were subrate multiplexed, so that demultiplexer 402 could determine a time slot's destination from the time slot's position within the sequence of time slots 202 in a frame 201, the implementation of demultiplexer 402 would degenerate to a conventional demultiplexer circuit.

At each output port 431, demultiplexer 402 accompanies each transmitted cell with its corresponding IBYTE CLK signal, and corresponding IBYTE-O CLK signal. Each output port 431 of demultiplexer 402 is connected to the input port 440 of corresponding FIFO buffer 403: transmitted cells are input to a DATA input, BYTE CLK signals are connected to a write (W) input, and BYTE-O CLK signals are connected to a save write pointer (SWP) input of input port 440. A FIFO buffer 403 is implemented as a circular buffer, in the conventional fashion. Receipt of a BYTE CLK signal at the W input causes FIFO buffer 403 to write time slot 202 present at the DATA input into the next free buffer location, which is pointed to by a write pointer. Receipt of a BYTE-O CLK signal at the SWP input causes the present value of the write pointer to be written internally in a pointer FIFO (not shown).

At its output port 441, each FIFO buffer 403 has a byte-serial DATA output and a threshold FLAG output connected to a first input port 450 of a multiplexer 404. Threshold FLAG output indicates whether FIFO buffer 403 is full up to a predetermined threshold: a signal is transmitted at threshold FLAG output to multiplexer 404 when FIFO buffer 403 does not contain at least one whole ATM cell. Each multiplexer 404 has a second input port 451 connected to a byte-serial DATA output of an idle cell memory 405. Idle cell memory 405 stores an idle ATM cell. Normally, multiplexer 404 retransmits at its output port 452 the data that it receives at its first input port 450 from FIFO buffer 403. However, when a signal received from threshold FLAG output of FIFO buffer 403 indicates that FIFO buffer 403 does not contain a whole ATM cell, and the signal corresponds with an OBYTE-O clock signal, multiplexer 404 switches connection of its output port 452 to its second input port 451, and retransmits at its output port 452 the data that it receives from idle-cell memory 405. As long as the threshold FLAG signal corresponds with an OBYTE-O clock signal, the idle cell will be transmitted.

CLK bus 19 brings to replicator 14 four clock signals: OBIT CLK, OBYTE CLK, and OBYTE-O CLK, which are equivalents of the signals generated by circuit 400 but are timed by TMS stage 11 controller 15 and not by link 16; and OFRAME CLK which is a start-of-frame 202 signal, also timed by controller 15.

OBYTE CLK, OBYTE-O CLK, and OFRAME CLK signals of bus 19 are connected to multiplexers 404, and through their first input ports 450 are connected to read (R), "copy saved read pointer to current read pointer" (CRPPP), and "copy saved write pointer to saved read pointer" (CWPRP) inputs, respectively, of output ports 441 of FIFO buffers 403. OBYTE CLK and OBYTE-O CLK signals are also connected directly to read (R) and "reset read pointer" (RRP) inputs of output port 442 of idle-cell memory 405. Each OBYTE CLK signal received by idle-cell memory 405 at the R input causes it to output at its DATA output the next sequential byte of the stored idle ATM cell, pointed to by an idle-cell memory read pointer. Each OBYTE-O CLK signal received by memory 405 at the RRP input causes the idle-cell memory read pointer to be reset to point to the first byte of the stored idle ATM cell.

Receipt of an OFRAME CLK signal at its CWPRP input causes a FIFO buffer 403 to read a next sequential write pointer value (that was stored in response to receipt of a signal at the SWP input of its input port 440) into an internal saved read pointer register (not shown). Each OBYTE CLK signal received by a FIFO buffer 403 at its R input causes FIFO buffer 403 to output at its DATA output the next sequential stored byte, pointed to by a FIFO buffer present read pointer. Each OBYTE-O CLK signal received by a FIFO buffer 403 at its CRPRP input causes FIFO buffer 403 to copy the saved read pointer value to the FIFO buffer present read pointer. Consequently, a TMS time slot 202 of bytes (e.g., an ATM cell) is read out of a FIFO buffer 403 repeatedly, until the value of the saved read pointer changes. As this happens only at frame 201 boundaries, as explained above, the result is that a single TMS time slot 202 is read out of a FIFO buffer 403 repeatedly, as many times as there are time slots 202 in a TMS frame 201.

The difference in values of the present write pointer and the saved read pointer determines whether the FIFO buffer threshold FLAG signal should be activated: a threshold FLAG signal is generated when a comparison of the values of the present write pointer and the saved read pointer indicates that they are less than an ATM cell's worth of bytes apart. When the threshold FLAG signal is present, a multiplexer 404 is receiving data from idle-cell memory 405 at its second input port 451, and blocks OBYTE CLK, OBYTE-O CLK, and OFRAME CLK signals from being transmitted at the first input port 450 to the connected FIFO buffer 403. Multiplexer 404 thereby prevents data from being read out of FIFO buffer 403 while it is not ready to receive it, and thereby prevents the loss of any data from FIFO buffer 403.

The net result of the FIFO buffer 403 and multiplexer 404 configuration described above is as follows: multiplexer 404 reads out and retransmits each ATM cell from FIFO buffer 403 as many times in succession as there are time slots 202 in a TMS frame 201. When no ATM cell is available in FIFO buffer 403, multiplexer 404 receives and retransmits the idle ATM cell from idle-cell memory 405 as many times in succession as there are time slots 202 in a TMS frame 201.

If idle-cell generation and transmission were not necessary, idle-cell memory 405 and multiplexers 404 would be eliminated. Alternatively, multiplexers 404 could be eliminated even when idle-cell generation is necessary, by connecting idle-cell memory to an additional and separate input 42 of TMS stage 11, and connecting threshold FLAG signals from FIFO buffers 403 to the TMS stage controller 15 to cause TMS stage 11 to perform the idle cell selection function.

Output ports 452 of multiplexers 404 are byte-serial, and each is connected to an input port 460 of a conventional parallel-to-serial converter 406. Each converter 406 has a bit-serial output port 461 connected to a link 17. It receives the BIT CLK signals from bus 20 and uses them to clock out bits 203 of each received byte onto the connected link 17 in serial form.

FIGS. 5A-5H graphically show the various clocking signals of FIG. 4 and their relationships.

Figure 6:
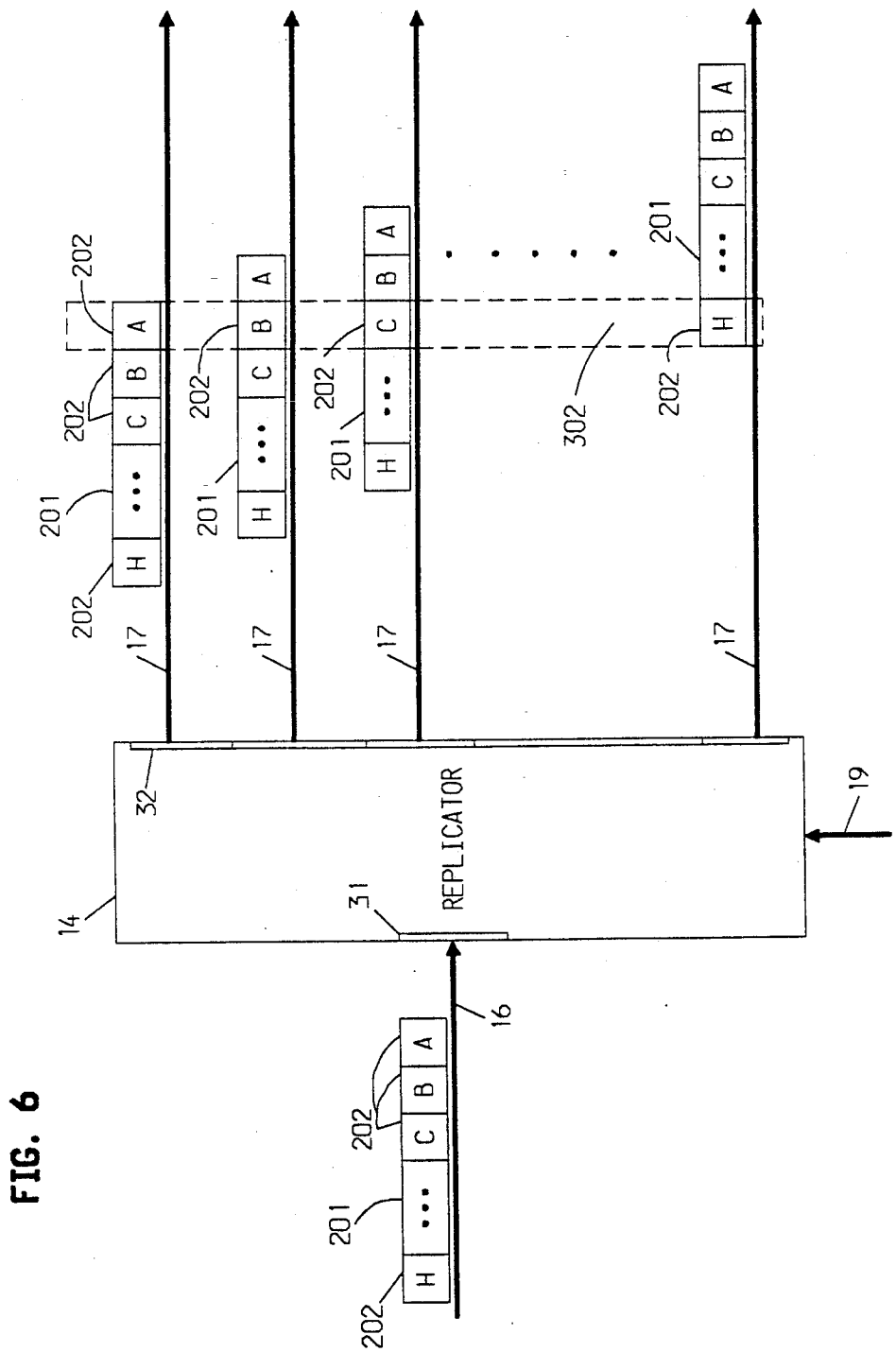
FIG. 6 is a block diagram of a second illustrative embodiment of a replicator of the system of FIG. 1.

FIG. 6 shows a second illustrative embodiment of the functionality of a replicator 14. This embodiment is particularly suited for use with subrate-multiplexed links 16. For each frame 201 received at its input port 31, replicator 14 outputs a replica of that frame 201 at each one of its output ports 32. However, the replicas are delayed in time with respect to each other by a time-slot interval 302. Consequently, each time slot 202 of a received frame 201 is output at each replicator 14 output port 32 during a different time-slot interval 302, and each time slot 202 of a received frame 201 is made available to TMS stage 11 on each link 17 at different times.

Figure 7:
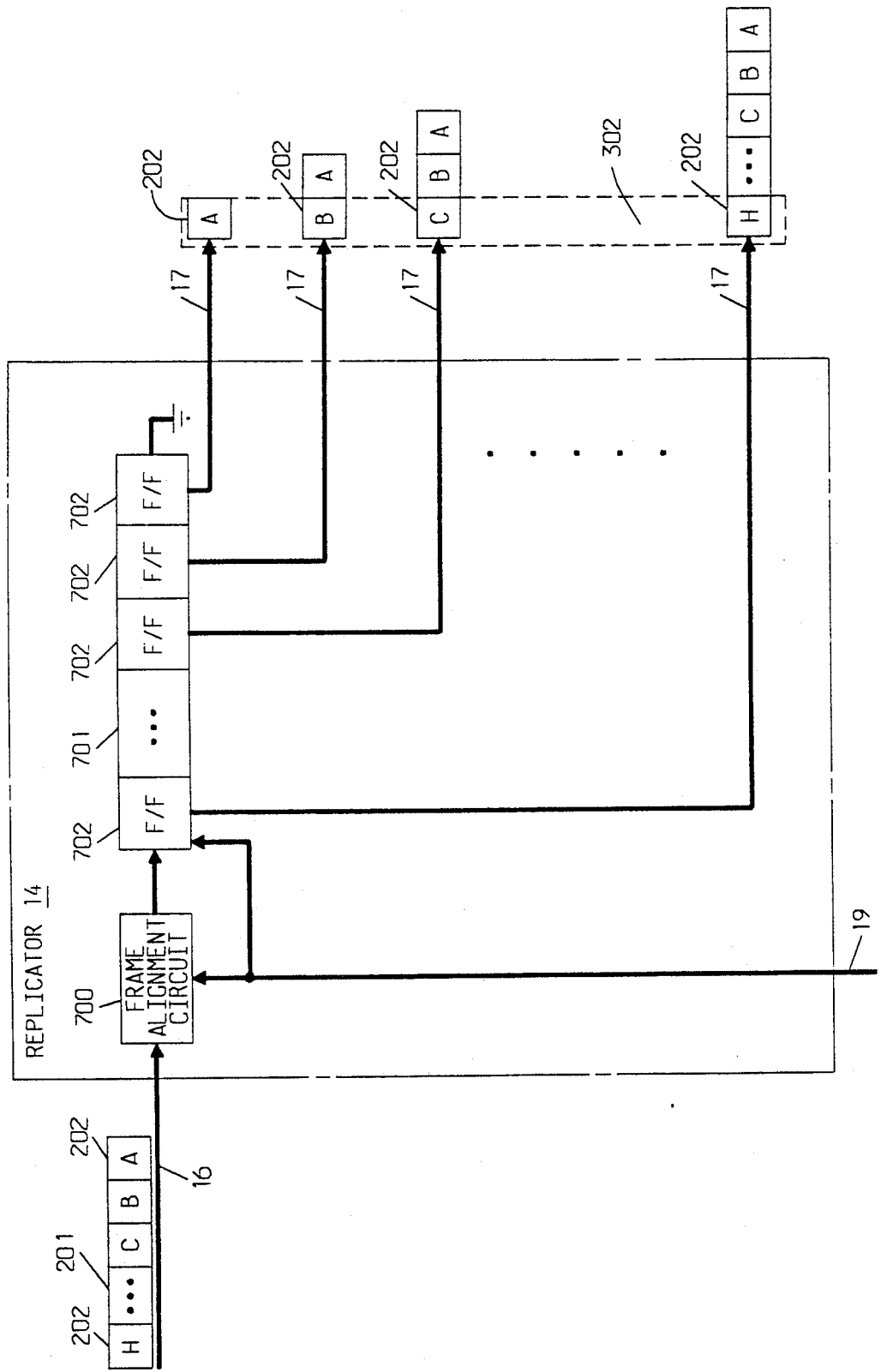
FIG. 7 is a block diagram of a first implementation of the replicator of FIG. 6.

FIG. 7 shows a first illustrative implementation of replicator 14 of FIG. 6, which is used in conjunction with single-bit 203 time slots 202. In this implementation, replicator 14 comprises a frame alignment circuit 700 followed by a serial-input, parallel-output shift register 701. Circuit 700 is a conventional circuit which synchronizes input from link 16 into register 701 according to timing signals supplied by bus 19. Thereby both input to and output from register 701 are made synchronous with the operation of TMS stage 11. Shift register 701 is also conventional, and comprises a plurality of serially connected master-slave flip-flops 702, one for each time slot 202. Each flip-flop 702 forms a storage cell for a time slot 202. In addition to being connected to the input of the adjacent flip-flop 702, the output of each flip-flop 702 is also connected to a different link 17. Shift register 701 is also clocked by timing signals supplied by bus 19. During a first time-slot interval 302, the first one-bit time slot 202 of a received frame 201, designated as time slot A, is clocked into the first flip-flop 702 of shift register 701 and is output on a first link 17. During a second time-slot interval 302, the first time slot A is clocked from the first flip-flop 702 into a second flip-flop 702 of shift register 701 and is output on a second link 17, while the second time slot 202 of the received frame 201, designated as time slot B, is clocked into the first flip-flop 702 of shift register 701 and is output on the first link 17. During a third time-slot interval 300, time slot A is moved to the next sequential flip-flop 702 and is output on the next link 17, while time slot B replaces time slot A in its previous position, and time slot C replaces time slot B in its previous position, and so on. It takes a full frame interval 301 before all flip-flops 702 of shift register 701 are occupied by time slots 202 of a single received frame 201, and it takes another frame interval 301 before all flip-flops 702 of shift register 701 are free of time slots 202 of that received frame 201. In other words, a received frame 201 takes two frame intervals 301 to make a full transition through shift register 701.

Figure 8:
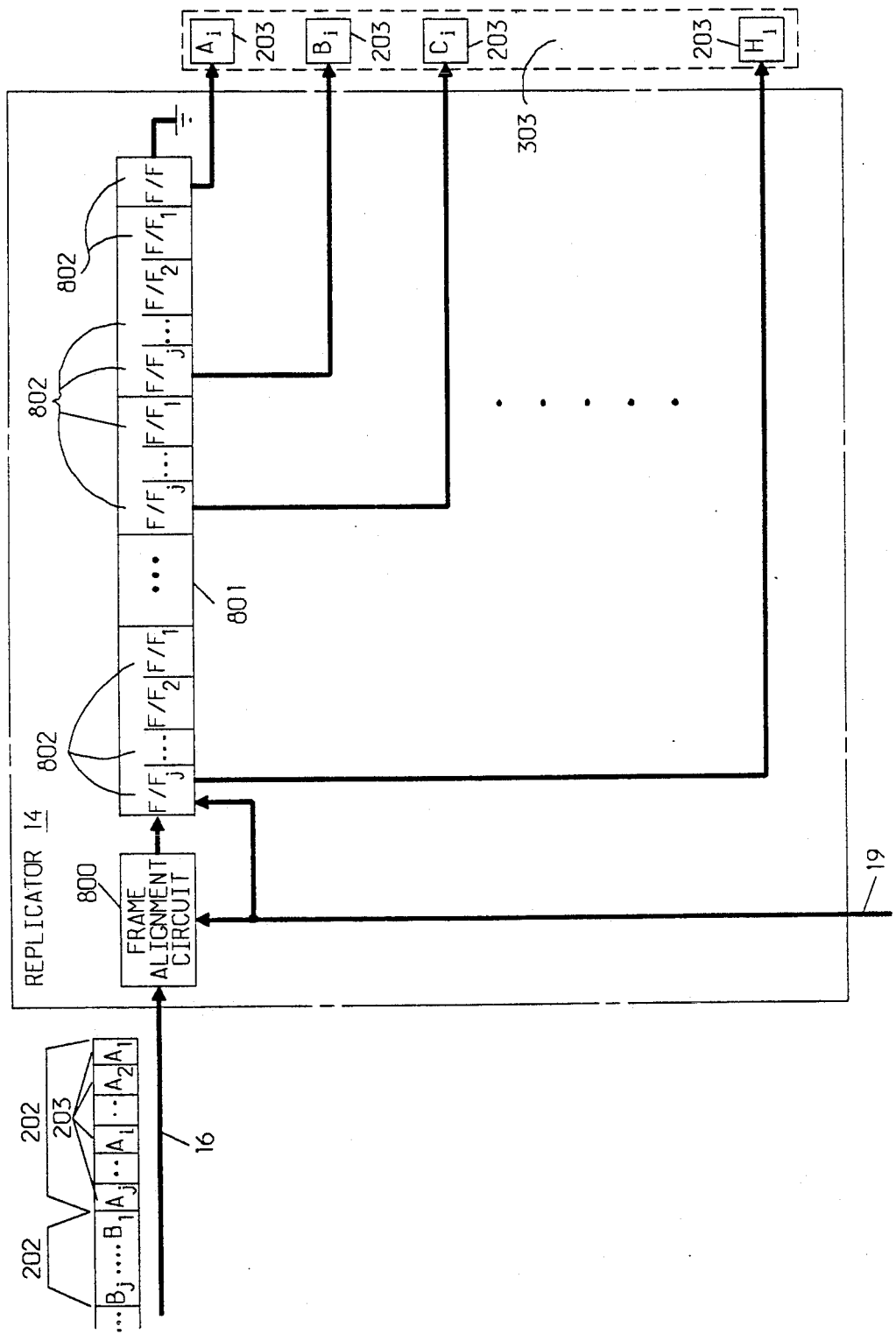
FIG. 8 is a block diagram of a second implementation of the replicator of FIG. 6.

FIG. 8 shows a second illustrative implementation of replicator 14 of FIG. 6, which is used in conjunction with multi-bit 203 time slots 202. This implementation comprises a conventional frame alignment circuit 800 followed by a conventional shift register 801, and thus resembles the implementation of FIG. 7. However, for each flip-flop 702 but the last one of register 701, register 801 has a plurality of flip-flops 802, one for each bit 302 of a time slot 202, referred to herein as a time slot cell. Register 801 has a single last flip-flop 802 that corresponds to the last flip-flop 702 of register 701. Links 17 are connected to the first flip-flop 802 of register 801 and to every Jth subsequent flip-flop 802, where J is the number of bits 203 per time slot 202. Bits 203 are serially clocked into and through shift register 801 at the rate of one bit 203 through each flip-flop 802 per bit interval 303. Consequently, during a single bit interval 303, all links 17 carry the same sequential bit 203 of different time slots 202 in parallel, and sequentially-adjacent bits 203 of a single time slot 202 appear on the same link 17 serially during sequential bit intervals 303.

Figure 9:
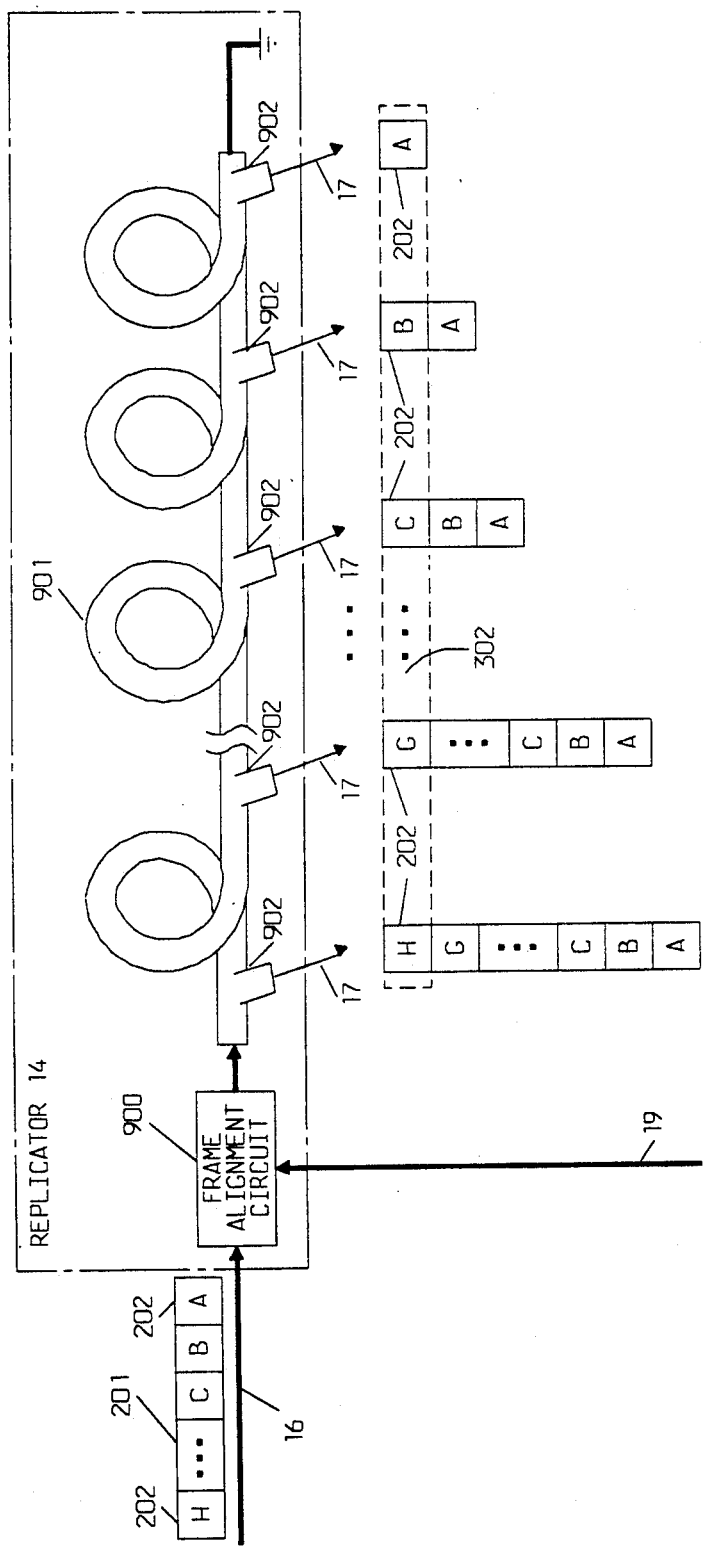
FIG. 9 is a block diagram of a third implementation of the replicator of FIG. 6.

FIG. 9 shows a third illustrative implementation of replicator 14 of FIG. 6. This implementation is a non-digital equivalent of the implementations of FIGS. 7 or 8. It is particularly suited for use in an optical switching system 10. Like the implementation of FIGS. 7 or 8, it includes a frame alignment circuit 900, which is a functional equivalent of circuit 700 or 800. But shift registers 701 or 801 of FIGS. 7 or 8 are replaced in this implementation by a delay line 901. Illustratively, delay line 901 is a length of optical fiber having an end-to-end signal propagation length of a frame interval 301. In this implementation, flip-flops 702 are replaced by signal taps 902 which are spaced along delay line 901 a time-slot interval 302 of signal propagation apart from each other. Links 17, which are illustratively optical links in this example, are connected to taps 902. A frame 201 received on a link 16 is bit-serially transmitted into delay line 901 and propagates therethrough. During a time-slot interval 302, a different time slot 202 appears at each tap 902 and a portion of its signal energy is diverted to the connected link 17. For a multi-bit 203 time slot 202, during each bit interval 303 of a time-slot interval 302, a different bit 203 of one time slot 202 is transmitted and appears at one tap 902, and bits 203 of the different time slots 202 appear at the different taps 902. Thus, from an external functional viewpoint, replicator 14 of FIG. 9 is the equivalent of the replicator 14 of FIGS. 7 or 8.

Of course, it should be understood that various changes and modifications may be made to the above-described illustrative embodiment of the invention. For example, the FIFOs of the first illustrative embodiment of the replicator may each be replaced by a multi-buffer arrangement wherein one buffer is being loaded from the demultiplexer while another, previously-loaded, buffer is being repeatedly read out by the multiplexer. The first embodiment may be extended to also implement multi-ATM cell TMS time slots. Or, the shift register of the second illustrative embodiment of the replicator may be replaced by a pair of rotation registers such that, during each frame interval, one rotation register is being loaded with a presently-received frame while the second rotation register outputs on each link during each time-slot interval a different time slot of a previously-received frame. The second illustrative embodiment may be extended to also handle ATM cells, either by providing a shift register having as many flip-flops per time-slot cell as there are bits in an ATM cell, or by providing a delay line having a delay between taps equal to the propagation time of an ATM cell. And, of course, both implementations may be readily extended to handle non-ideal events, such as buffer overload, race conditions, etc. Such changes and modifications may be made without departing from the spirit and the scope of the invention. It is therefore intended that such changes and modifications be covered by the following claims.

We claim:

1. A time-division switching system comprising:
   time-multiplexed switching means having a plurality of inputs and at least one output port, for transmitting at any output port during each time-slot interval a time slot of information received at any input; and
   a plurality of replication means, each having an input port for receiving frames of time slots of information and each having a plurality of outputs each connected to a different input of the time-multiplexed switching means, each replication means for transmitting a frame of received time slots of information to the inputs of the time-multiplexed switching means to which the replication means is connected during each time-slot interval.

2. The system of claim 1 wherein:
   each replication means receives time slots of information at the input port at a predetermined rate; and
   the time-multiplexed switching means switches time slots of information received at its inputs to any output port at no less than the predetermined rate.

3. The system in claim 1 wherein:
   each replication means receives individual time slots of information at the input port during different time-slot intervals, and during each time-slot interval transmits a frame of received time slots of information in parallel at a plurality of outputs.

4. The system of claim 1 wherein:
   each replication means has as many outputs as there are time slots in a frame.

5. The system of claim 4 wherein:
   the time-multiplexed switching means has as many inputs connected to each replication means as there are time slots in a frame, and has each input of said as many inputs connected to a different one output of an individual replication means.

6. The system of claim 1 wherein:
   each replication means includes first means responsive to receipt of a frame of time slots of information at the input port for transmitting individual ones of the received time slots of information at individual ones of the outputs during each time-slot interval of a frame interval.

7. The system of claim 6 wherein:
   the first means are for transmitting every one of the received time slots of information each at a different one of the outputs during each time-slot interval of a frame interval.

8. The system of claim 1 wherein:
   each replication means includes first means responsive to receipt of frames of time slots of information at the input port, for transmitting different ones of the received time slots of information at a different ones of the outputs during each time-slot interval of a frame interval.

9. The system of claim 8 wherein:
   the first means are for transmitting every one of the time slots of information of a received frame at each output during different time-slot intervals.

10. The system of claim 1 wherein
    each replication means comprises:
    a demultiplexer having an input connected to the input port and a plurality of demultiplexer outputs, one for each time slot of a received frame, responsive to receipt from the input port of a frame of time slots for transmitting each time slot of the received frame at a different demultiplexer output; and
    a plurality of retransmission means a different one connected between each demultiplexer output and an input of the time-multiplexed switching means, each responsive to receipt of a time slot from the connected demultiplexer output for transmitting the received time slot to the connected input of the time-multiplexed switching means during every time-slot interval of a frame interval.

11. The system of claim 1 wherein:
    each replication means includes first means which respond to receipt of frames of time slots of information at the input port by transmitting each time slot of information of each received frame at each output, such that time slots of information are transmitted at each output one at a time and different time slots of information are transmitted at different outputs at a same time.

12. The system of claim 11 wherein:
    the first means are for transmitting each time slot of information of each received frame at each output, one time slot of information during each successive time-slot interval and a different time slot of information at each output during any one time-slot interval.

13. The system of claim 1 wherein:
    each replication means includes first means responsive to receipt of frames of time slots of information at the input port, for transmitting a frame of different time slots of received information in parallel at a plurality of outputs during each time-slot interval.

14. The system of claim 13 wherein:
    the first means are further for transmitting each time slot of information of each received frame at each output a time slot of information at a time, and transmitting different time slots of information at different outputs at a same time.

15. The system of claim 1 wherein:
    each replication means comprises
    a shift register having a serial input connected to the input port and having a sequence of storage cells, one cell for each time slot of a received frame, each cell having an output of its stored contents connected to an input of the time-multiplexed switching means and forming with the outputs of the other cells a parallel source of time slots for the time-multiplexed switching means, the shift register responsive to receipt from the input port of a frame of time slots for clocking the frame into and through the sequence of cells one time slot through one cell during each time-slot interval.

16. The system of claim 1 wherein:
    each replication means comprises a propagation delay arrangement having a serial input connected to the input port to receive and propagate through the arrangement frames received from the input port, the arrangement also having a sequence of a plurality of taps each connected to an input of the time-multiplexed switching means, one tap per each time slot of a received frame, the taps separated from each other in the sequence by a time-slot interval of propagation delay together to form a parallel source of time slots for the time-multiplexed switching means.

17. A time-division switching system for switching time-division multiplexed information between a first plurality of incoming telecommunication links and a second plurality of outgoing telecommunication links, comprising:

a plurality of replication means, a different one connected to each incoming link to receive frames of time slots of information, each replication means having as many outputs as there are time slots in a frame and for transmitting a frame of received time slots of information during each time-slot interval; and time-multiplexed switching means having as many inputs as the plurality of replication means have outputs, each input connected to a different output of the plurality of replication means and having a plurality of output ports a different one connected to each outgoing link for transmitting at every output port during each time-slot interval a time slot of information received at an input.

18. The system of claim 17 wherein:

each replication means receives each time slot of information at its input port during a different time-slot interval and transmits each individual time slot of a received frame at a different one output during each time-slot interval of a frame interval.

19. The system of claim 17 wherein:

each replication means receives each time slot of information at its input port during a different time-slot interval and transmits each time slot of a received frame at each output during different time-slot intervals of a frame interval.

* * * * *